UNITED STATES PATENT OFFICE.

LISETTE SCHOTT, OF LONDON, ENGLAND.

WATERPROOFING AND PRESERVATIVE PAINT OR COMPOSITION.

966,366.  Specification of Letters Patent.  Patented Aug. 2, 1910.

No Drawing.  Application filed November 2, 1909. Serial No. 525,943.

*To all whom it may concern:*

Be it known that I, LISETTE SCHOTT, a subject of the Emperor of Germany, residing at London, England, have invented certain new and useful Improvements in Waterproofing and Preservative Paints or Compositions, of which the following is a specification.

My invention has reference to paints or compositions for waterproofing and preserving and protecting various substances from the action of rust and other corrosive agents.

The paint in accordance with my invention is particularly useful for treating leather such as the soles of boots and shoes for the purpose of rendering them impervious to wet and also to increase their wear resisting qualities.

It may also be advantageously employed as an antifouling paint or composition for ships' bottoms as it effectually prevents the adhesion of barnacles and weeds and resists the attacks of insects.

For protecting metals against the action of rust it is particularly valuable; for instance it may be used to coat iron or lead water or gas pipes.

It may also be employed for coating damp walls and in fact is useful for all purposes where it is desired to either waterproof or to protect and preserve surfaces of all kinds against corrosion or deterioration.

In order that my invention may be readily understood by those skilled in the art to which it appertains, I will now proceed to describe the best method known to me for carrying the invention into effect.

My improved paint or composition is composed of pure silver, borax and a vegetable oil such as linseed oil and if desired a suitable pigment. The proportions may be as follows:—Pure silver in fine powder 1 ounce, borax 4 ounces, linseed oil 1 pint.

The silver and the borax are carefully mixed together and introduced into the linseed oil which is continually stirred the while in order that the whole mass may be thoroughly homogeneous. The mixture is now submitted to heat until the materials are properly combined. For instance at ordinary atmospheric pressure fifteen to eighteen hours will suffice under occasional agitation or stirring. At the end of this period the ingredients will have combined to form a paint or composition of the right consistency to admit of its being applied to the surfaces it is desired to waterproof or protect. A suitable pigment in the form of powder is now added. I have found black, blue or red to give the best results, and the paint or composition is then ready for use.

The proportions of the various ingredients hereinbefore mentioned I have found in practice to give good results but I wish it to be clearly understood that I do not desire to limit myself to the exact quantities of the several ingredients as they may be varied more or less in accordance with the purpose for which the final product is intended without in any way departing from the spirit of my invention.

The paint or composition prepared in the manner above described may be spread or applied to the surface it is desired to waterproof or protect with a brush, and when dry will form a thoroughly protective coating which effectually prevents damp passing therethrough and when applied to metallic surfaces forms a strongly adherent coating which will not chip or peel off, thus forming an efficient protection against rust and corrosion.

What I claim and desire to secure by Letters Patent is:—

1. A waterproofing and preservative paint or composition consisting of pure silver in powder borax and a vegetable oil heated together for the purpose specified.

2. A waterproofing and preservative paint or composition consisting of pure silver in powder borax and linseed oil heated together for the purpose specified.

3. A waterproofing and preservative paint or composition consisting of pure silver in powder one ounce, borax four ounces, and a vegetable oil one pint heated together for from fifteen to eighteen hours for the purpose specified.

In testimony whereof I have hereunto set my hand in presence of two subscribing witnesses.

LISETTE SCHOTT.

Witnesses:
P. WOODWARD,
H. W. JAMESON.